United States Patent [19]
Thandiwe et al.

[11] Patent Number: 5,932,989
[45] Date of Patent: Aug. 3, 1999

[54] METHOD FOR AN ELECTRONIC DEVICE TO DETECT THE PRESENCE OF A BATTERY CHARGER

[75] Inventors: Iilonga Thandiwe, Atlanta; Brian T. Pozsgay, Lawrenceville, both of Ga.

[73] Assignee: Motorola, Inc., Schaumburg, Ill.

[21] Appl. No.: 09/072,092

[22] Filed: May 4, 1998

[51] Int. Cl.$^6$ .................................................. H01M 10/44
[52] U.S. Cl. .................................... 320/106; 320/DIG. 12
[58] Field of Search ...................... 320/106, 112, 320/132, 150, 162, 165, DIG. 12

[56] References Cited

U.S. PATENT DOCUMENTS

| | | | |
|---|---|---|---|
| 4,709,202 | 11/1987 | Koenck et al. | 320/112 |
| 5,411,537 | 5/1995 | Munshi et al. | 320/163 X |
| 5,515,303 | 5/1996 | Gargin, Jr. et al. | 364/708.1 |
| 5,602,456 | 2/1997 | Gargin, Jr. et al. | 320/112 |

*Primary Examiner*—Edward H. Tso
*Attorney, Agent, or Firm*—Felipe J. Farley

[57] ABSTRACT

A battery (104) is connected to a host device (106), the host device is an electrical or electronic device, such as a cellular telephone. The battery is rechargeable, and contains a memory (110) connected to a data line (116). The battery is connected to a battery charger (102) while also connected to the host device. The battery charger detects the battery (306), reads the battery information (308) from the battery memory. The data line is common to the battery charger, battery, and host device. The charger indicates its presence to the host device by changing the voltage level on the data line (310) from a normal first level, such as a logic level of one, to a second level, such as a logic level of zero, and holds the data line at the second level. The host detects the presence of the battery charger (312) after the data line has been held at the second level for a sufficient period of time, and then may take the desired actions (314).

13 Claims, 3 Drawing Sheets

METHOD FOR AN ELECTRONIC DEVICE TO DETECT THE PRESENCE OF A BATTERY CHARGER

TECHNICAL FIELD

This invention relates in general to battery powered electronic and electrical devices, and particularly such devices using a rechargeable battery that can be recharged while operating the electrical or electronic device.

BACKGROUND OF THE INVENTION

A great many electronic devices are powered by rechargeable batteries. Perhaps the best example of which is a typical cellular telephone. Because of the power consumption of a cellular telephone, rechargeable batteries are a much lower cost means of powering the telephone than using primary, or nonrechargeable batteries. Accordingly, a great deal of work has been done in the battery and battery charger arts. Presently, a number of manufacturers have designed and sell rechargeable battery packs, or simply batteries, that include electronic digital memory devices. The information stored in these memory devices includes battery parameters to allow the charger to select an optimal charge regime for the particular type of battery.

At the same time, people have become more dependent on devices such as cellular telephones, and often leave them on as much as possible. Since the battery must periodically be recharged, manufacturers have designed battery chargers that will accept the battery while it is connected or attached to the host device. In this way, the user can leave the device on so as not to miss any incoming phone calls.

Once the battery and the attached device are placed into the battery charger, the battery charger can commence charging the battery according to the information read from the battery memory. At the same time, it is desirable to take certain actions in the host device, such as turning off the display of the battery fuel gauge, and turning on keypad backlights, for example. Since the battery is being charged, there is no need to worry about draining excess current from the battery, as when operating the device away from the battery charger. However, the host device needs to be able to detect the presence of the battery charger before any such actions can be taken. Therefore, there is a need for a method for an electronic device to detect the presence of a battery charger, so that the electronic device can take actions such as turning off display segments. Furthermore, there is a need for the device to be able to detect the removal of the battery charger, so that high current drain activities may be minimized so as to prolong the operation time afforded by the battery.

DETAILED DESCRIPTION OF A PREFERRED EMBODIMENT

Figure 1:
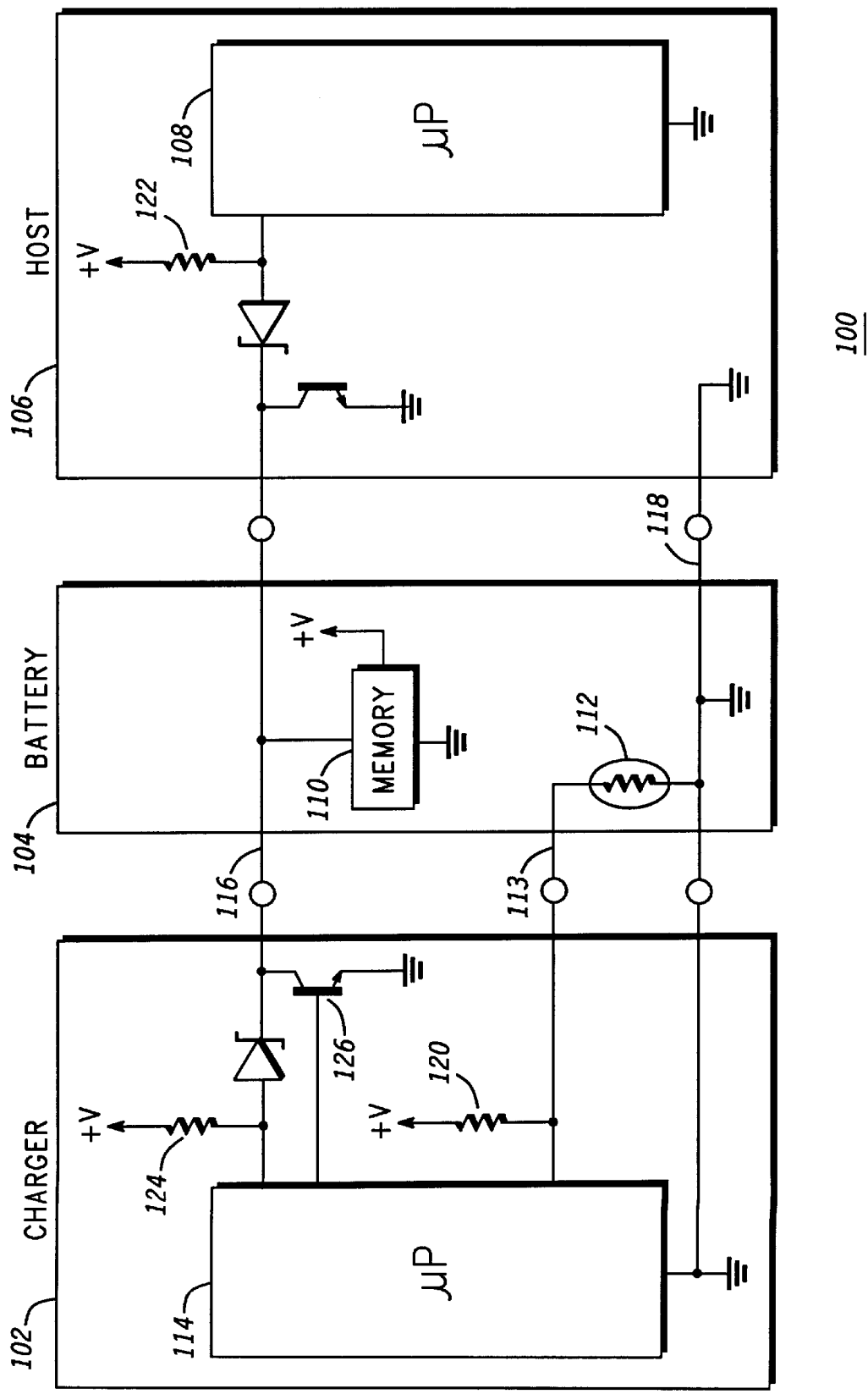
FIG. 1 is a block diagram of battery powered system including a battery charger, battery, and a host device, in accordance with one embodiment of the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is shown therein a block diagram of battery powered system 100 including a battery charger 102, battery 104, and a host device 106, in accordance with one embodiment of the invention. The host device is an electronic device, such as, for example, a cellular telephone, and includes a microprocessor 108. The battery comprises at least one rechargeable battery cell, a memory device 110, and a thermistor 112. The thermistor is used to indicate the battery temperature to the charger over a thermistor line 113, as is conventional. The battery charger comprises a microprocessor 114, and circuitry for providing charging power to the battery as is conventional. Furthermore, the charger has a pocket designed to accept and hold a battery, or a host device with a battery attached to the host device. The battery charger and host device have electrical contacts and mating features for connecting with the battery, which has corresponding electrical contacts and mating features, as is conventional. The battery may be connected to the host device, the battery charger, or both at any given time. Typically, however, the battery remains attached to the host device for convenience, and when the user desires to recharge the battery, both the host device and the battery are placed in the pocket of the battery charger. The memory device 110 is accessible via a data line 116 by the host device and the battery charger. A ground line 118 is common to all three.

In practicing the invention, the battery is connected to the electronic device prior to inserting them, together, into the charger. Once inserted into the charger, the battery becomes connected to the battery charger by electrical contacts, as is well known. The charger will detect the presence of the battery by any of the well known methods, such as by detecting a voltage of the battery, or, as in the preferred embodiment, detecting a voltage level change on the thermistor line. The voltage level change occurs, for example, when the thermistor becomes connected to the charger, and forms a voltage divider with a thermistor pull up resistor 120. Once the battery has been detected, the battery charger must obtain the battery information stored in the memory device of the battery, so the memory device is read over the data line by the charger. After performing the reading, the charger pulls the data line low. Normally the data line is held in a first level, such as a high level by a data pull up resistor 122 in the host device, and a similar pull up resistor 124 in the charger. Thus, by high level, or simply high, it is meant a voltage level considered to be a logic level value of one, and by low it is meant a voltage level considered to be a logic level of zero. The battery charger then holds the data line at a second level, for example, by pulling the data line low, such as with a transistor 126. The electronic device 106 detects the presence of the battery charger by observing the data line. If the data line is detected at the second level, the host device begins a timer. If the data line remains low for a preselected period of time, then the host device infers that the charger is present, and takes appropriate actions, such as shutting off a battery indicator. The preselected period of time is long enough so that, under normal operation, no other event could cause the data line to be low for such a period of time. A time of about one second is typically sufficient.

Figure 2:
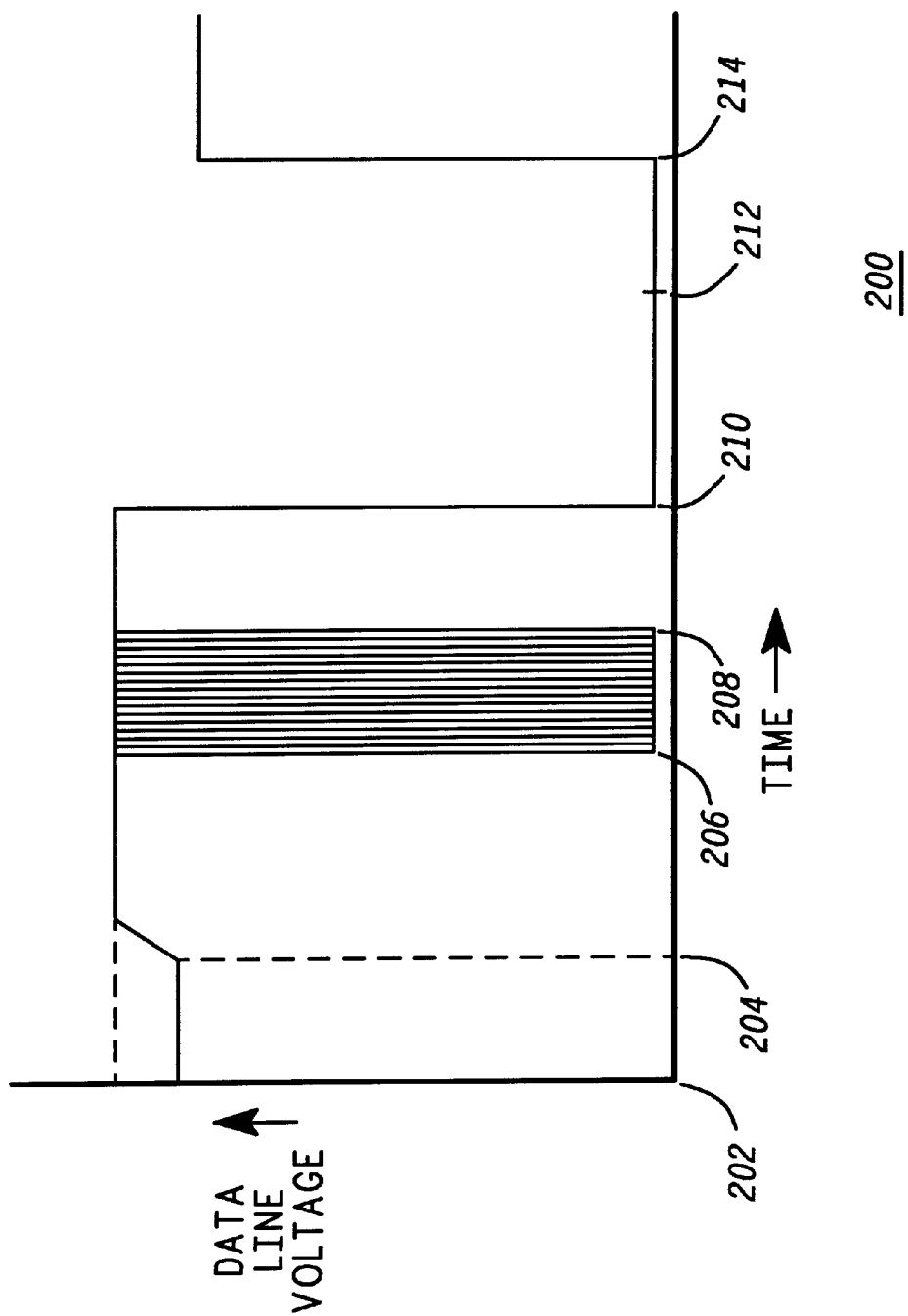
FIG. 2 is a graph of voltage on a data line vs. time in accordance with one embodiment of the invention.

Referring now to FIG. 2, there is shown a graph 200 of voltage on the data line vs. time in accordance with one embodiment of the invention. At time 202, the battery is connected to the host device. At time 204, the battery is further connected to the battery charger. Between times 202 and 204, the voltage on the data line is pulled up only by the pull up resistor in the host device. At time 204, because of the pull up resistor in the battery charger, the voltage on the data line rises slightly. In either case, the voltage on the data line is sufficiently high to indicate a logic level of one. Subsequent to time 204, and prior to time 206, the battery charger detects the battery. To verify that a battery is present, a test may be performed, such as providing current to the battery to see if the current will pass through the battery. At time 206 the battery charger has determined that a battery has been connected to it, and begins reading the memory device, thus the data line alternates between the first level and the second level, depending on the value of the data being read from the memory. The preferred communication scheme is a serial asynchronous scheme. Typically the battery charger will provide a code on the data line which is received by the memory device, and the memory device will respond by writing the contents of the memory on the data line, which is read by the battery charger. At time 208 the charger has finished reading the memory. Shortly thereafter, and beginning at time 210, the battery charger pulls down and hold the data line low. The host device, upon observing the data line being low, begins a timer. At time 212 the timer has matured without the data line changing from a low level, and the host device determines that the charger is present, and connected to the battery. Some time thereafter, at time 214, the battery and host device are removed from the charger. Accordingly, since the loading of the data line by the charger is no longer possible, the data line returns to its original level, and the host device detects the change back to the first level, and reactivates the battery related functions.

Figure 3:
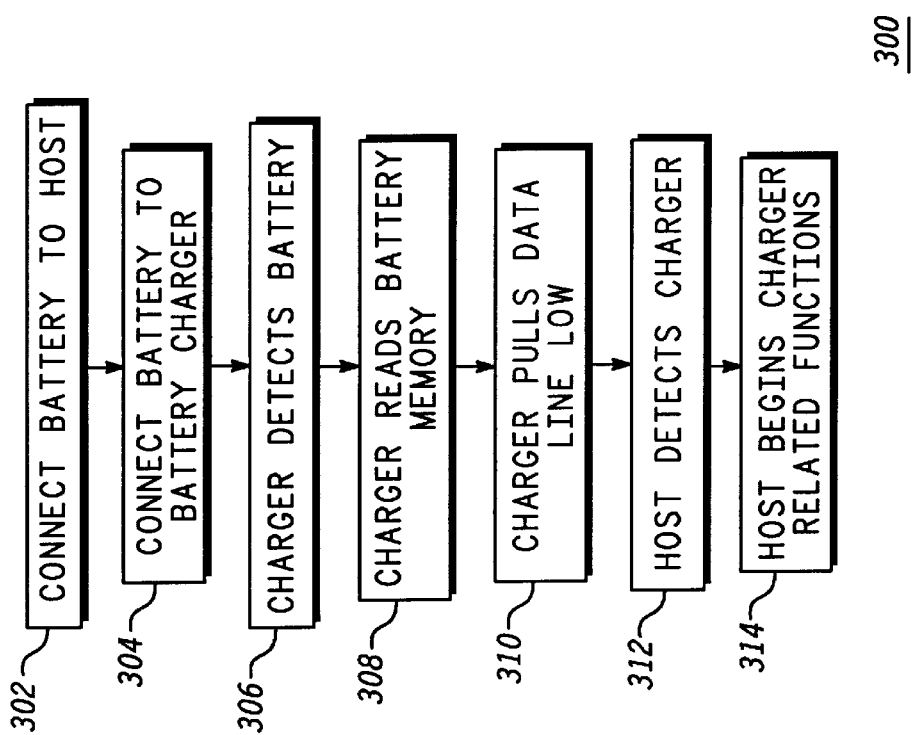
FIG. 3 is a flow chart diagram of a method of detecting the presence of a battery charger in accordance with one embodiment of the invention.

Referring now to FIG. 3, there is shown a flow chart diagram 300 of a method for detecting the presence of a battery charger in accordance with one embodiment of the invention. The process begins by connecting the battery to a host electronic device, as in step 302. Next, the battery, while connected to the host, is further connected to the battery charger, in step 304. The battery charger then detects the connection to the battery, in step 306, and commences reading the memory in the battery over that data line, in step 308. The battery charger reads battery parameters from the memory in the battery to optimize a charge regime for the battery. Upon successfully reading the battery memory, the charge pulls the data line low, as in step 310. The charger holds the data line low, and since the data line is normally high, if the data line is held low long enough, the host device will detect the holding of the data line, as in step 312. Once the host device has detected the charger, it can take the desired actions, such as turning off the display of a battery fuel gauge.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method, for an electronic device powered by a battery, for detecting a presence of a battery charger, the battery having a memory device disposed therein coupled to a data line, a voltage level on the data line having a first level and a second level, the voltage level normally being at the first level, the method comprising the steps of:

connecting the battery to the electronic device, including connecting the data line of the battery to the electronic device;

connecting the battery to the battery charger, performed after the step of connecting, while the electronic device is still connected to the battery;

detecting the battery by the charger;

reading the memory device over the data line, performed by the charger after the step of connecting the battery to the battery charger;

holding the voltage level of the data line at the second level; and detecting the voltage level of the data line being at the second level by the electronic device.

2. A method for detecting the presence of a battery charger as defined in claim 1, wherein the step of detecting the battery is performed by detecting a thermistor voltage level change on a thermistor line.

3. A method for detecting the presence of a battery charger as defined in claim 1, wherein the step of reading the memory device comprises reading battery information from the memory device.

4. A method for detecting the presence of a battery charger as defined in claim 1, wherein the step of holding the voltage level of the data line at the second state is performed by holding the voltage level of the data line at a logical zero level.

5. A method for detecting the presence of a battery charger as defined in claim 1, wherein the step of detecting the voltage level is performed by observing the voltage level of the data line being in the second state for a preselected period of time.

6. A method for an electronic device connected to a battery to detect a presence of a battery charger, the method comprising:

connecting the battery to the battery charger;

detecting a voltage level change on a thermistor line of the battery charger;

applying a charge current to the battery, performed by the battery charger after performing the step of detecting;

reading a memory device disposed in the battery over a data line, performed by the battery charger after performing the step of detecting;

holding a voltage level of the data line at a logic level of zero; and detecting the voltage level being at the logic level of zero, performed by the electronic device.

7. A method as defined in claim 6, wherein the step of reading comprises reading battery information from the memory device.

8. A method as defined in claim 6, wherein the step of detecting the voltage level being a the logical level zero level comprises detecting the logic level of zero for a preselected period of time.

9. A method for a host device having a battery connected thereto to detect a presence of a battery charger, the battery having a memory device disposed therein connected to a data line, the electrical device connected to the data line, the data line having a first level and a second level, the method comprising the steps of:

detecting the battery, by the battery charger;

reading the memory device, by the battery charger, over the data line;

loading the data line so that the data line changes from the first level to the second level;

holding the data line at the second level, by the battery charger; and detecting the holding of the data line at the second level, by the host device.

10. The method of claim 9, wherein the step of detecting the battery comprises detecting a voltage change on a thermistor line.

11. The method of claim 9, wherein the step of reading the memory device comprises reading battery parameters stored in the memory device.

12. The method of claim 9, wherein the step of loading the data line comprises changing the data line from a logic level of one to a logic level of zero.

13. The method of claim 9, wherein the step of detecting the holding comprises detecting that the holding has occurred for at least a preselected period of time.

\* \* \* \* \*